(12) United States Patent
LeBoeuf

(10) Patent No.: US 6,541,572 B2
(45) Date of Patent: Apr. 1, 2003

(54) METHOD OF MAKING HIGH REFRACTIVE INDEX OPHTHALMIC DEVICE MATERIALS

(75) Inventor: Albert R. LeBoeuf, Burleson, TX (US)

(73) Assignee: Alcon Manufacturing, Ltd., Fort Worth, TX (US)

( * ) Notice: Subject to any disclaimer, the term of this patent is extended or adjusted under 35 U.S.C. 154(b) by 29 days.

(21) Appl. No.: 09/954,457

(22) Filed: Sep. 17, 2001

(65) Prior Publication Data

US 2002/0019492 A1 Feb. 14, 2002

Related U.S. Application Data

(63) Continuation-in-part of application No. 09/283,590, filed on Apr. 1, 1999, now abandoned.
(60) Provisional application No. 60/082,833, filed on Apr. 23, 1998.

(51) Int. Cl.[7] .......................... C08F 16/02; C08F 16/04; C08F 16/12; C08F 16/26
(52) U.S. Cl. .................. 525/327.3; 623/5.11; 623/5.12; 623/5.16; 623/6.56; 623/6.58; 623/6.59; 525/337; 525/344; 525/350; 525/353; 525/379; 525/380; 525/384; 351/160 H
(58) Field of Search ..................... 351/160 H; 623/5.11, 623/5.12, 5.16, 6.56, 6.58, 6.59; 525/327.3, 337, 344, 350, 353, 379, 380, 384

(56) References Cited

U.S. PATENT DOCUMENTS

| 4,388,448 A | * | 6/1983 | Melby | 525/327.3 |
| 4,755,565 A | * | 7/1988 | Snow | 525/327.3 |
| 5,211,662 A | | 5/1993 | Barrett et al. | 623/6 |
| 5,290,892 A | | 3/1994 | Namdaran et al. | 526/259 |
| 5,693,095 A | | 12/1997 | Freeman et al. | 623/6 |

FOREIGN PATENT DOCUMENTS

WO WO 97/24382 7/1997

OTHER PUBLICATIONS

Koch, D. *Foldable Intraocular Lenses,* Slack Incorporated, Thorofare, NJ, (1993), Chapter 8, "Alcon AcrySof™ Acrylic Intraocular Lens," pp. 161–177.
Refojo, "Glyceryl Methacrylate Hydrogels," *J. of Applied Polymer Science,* vol. 9, pp. 3161–3170 (1965).

* cited by examiner

*Primary Examiner*—D. R. Wilson
(74) *Attorney, Agent, or Firm*—Patrick M. Ryan

(57) ABSTRACT

Disclosed is a two-step method of making soft, high refractive index, acrylic ophthalmic device materials. In the first step, a copolymer containing pendant oxirane groups is formed by copolymerizing one or more aryl acrylic hydrophobic monomers with one or more compounds of the formula

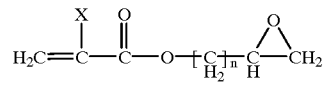

wherein
X is H or $CH_3$; and
n is 1–4.

In the second step, the copolymer containing pendant oxirane groups formed in the first step is reacted with a compound of the formula

W—T—H wherein
W is H, $CH_3(CH_2)_a$, or $Z(OCH_2CH_2)_b$;
a is 0–3;
b is 1–5;
Z is H, or $CH_3(CH_2)_p$;
p is 0–3; and
T is O, NH, S; provided that if T≠O, then W≠H.

15 Claims, No Drawings

METHOD OF MAKING HIGH REFRACTIVE INDEX OPHTHALMIC DEVICE MATERIALS

This application is a continuation-in-part application of U.S. Ser. No. 09/283,590, filed Apr. 1, 1999, now abandoned, which claims the benefit of U.S. Provisional Patent Application Serial No. 60/082,833, filed Apr. 23, 1998.

FIELD OF THE INVENTION

This invention is directed to ophthalmic device materials. In particular, this invention relates to soft, high refractive index, acrylic ophthalmic device materials that are particularly suited for use as intraocular lens ("IOL") materials.

BACKGROUND OF THE INVENTION

With the recent advances in small-incision cataract surgery, increased emphasis has been placed on developing soft, foldable materials suitable for use in artificial lenses. In general, these materials fall into one of three categories: hydrogels, silicones, and acrylics.

Hydrogel materials have a relatively low refractive index, making them less desirable than other materials because of the thicker lens optic necessary to achieve a given refractive power. Silicone materials generally have a higher refractive index than hydrogels, but tend to unfold explosively after being placed in the eye in a folded position. Explosive unfolding can potentially damage the corneal endothelium and/or rupture the natural lens capsule. Acrylic materials are desirable because they typically have a high refractive index and unfold more slowly or controllably than silicone materials.

U.S. Pat. No. 5,290,892 discloses high refractive index, acrylic materials suitable for use as an IOL material. These acrylic materials contain, as principal components, two aryl acrylic monomers. The IOLs made of these acrylic materials can be rolled or folded for insertion through small incisions.

U.S. Pat. No. 5,331,073 also discloses soft acrylic IOL materials. These materials contain as principal components, two acrylic monomers that are defined by the properties of their respective homopolymers. The first monomer is defined as one in which its homopolymer has a refractive index of at least about 1.50. The second monomer is defined as one in which its homopolymer has a glass transition temperature less than about 22° C. These IOL materials also contain a cross-linking component. Additionally, these materials may optionally contain a fourth constituent, different from the first three constituents, which is derived from a hydrophilic monomer. These materials preferably have a total of less than about 15% by weight of a hydrophilic component.

U.S. Pat. No. 5,693,095 discloses soft, foldable acrylic lens materials containing only two principal lens-forming components: one aryl acrylic hydrophobic monomer and one hydrophilic monomer. The materials comprise at least about 90% by weight of the two principal monomeric components.

SUMMARY OF THE INVENTION

According to the present invention, high refractive index, acrylic ophthalmic device materials are produced by a two-step method. In the first step, at least one aryl acrylic hydrophobic monomer is combined with up to a total of about 30% by weight of one or more compounds of the formula

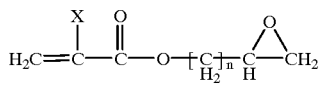

wherein
X is H or $CH_3$; and
n is 1–4;

and cured to form a copolymer containing pendant oxirane groups. In the second step, the copolymer containing pendant oxirane groups formed in step one is reacted with one or more compounds of the formula $$W\text{—}T\text{—}H \qquad (III)$$

wherein
W is H, $CH_3(CH_2)_a$, or $Z(OCH_2CH_2)_b$;
b is 1–5;
Z is H, $CH_3$, or $CH_3(CH_2)_a$;
a is 0–3; and
T is O, N, S; provided that if T≠O, then W≠H;

to form the ophthalmic device material of the present invention. The resulting material is suitable for use in ophthalmic devices, such as intraocular lenses, contact lenses, keratoprostheses, corneal rings, and corneal inlays.

DETAILED DESCRIPTION OF THE INVENTION

In the first step of the two-step method of the present invention, a copolymer containing pendant oxirane groups is prepared by copolymerizing a composition comprising i) one or more aryl acrylic hydrophobic monomers of the formula

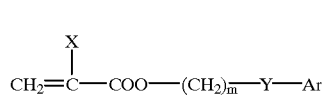

wherein:
X is H or $CH_3$;
m is 0–6;
Y is nothing, O, S, or NR, wherein R is H, $CH_3$, $C_nH_{2n+1}$(n=1–10), iso-$OC_3H_7$, $C_6H_5$, or $CH_2C_6H_5$; and
Ar is any aromatic ring which can be unsubstituted or substituted with H, $CH_3$, $C_2H_5$, n-$C_3H_7$, iso-$C_3H_7$, $OCH_3$, $C_6H_{11}$, Cl, Br,
$C_6H_5$, or
$CH_2C_6H_5$;

and (ii) a total of about 30% by weight or less of one or more compounds of the formula

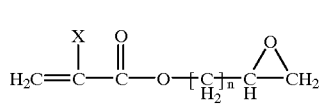

wherein
X is H or $CH_3$; and
n is 1–4.

Aryl acrylic hydrophobic monomers of formula I are described in U.S. Pat. No. 5,290,892, the entire contents of which are hereby incorporated by reference. Preferred aryl acrylic hydrophobic monomers for use in the materials of the present invention are those wherein m is 2–4, Y is nothing or O, and Ar is phenyl.

Suitable monomers of formula I include 2-phenoxyethyl acrylate; 2-phenylethylthio acrylate; 2-phenylethylamino acrylate; phenyl acrylate; benzyl acrylate; 2-phenylethyl acrylate; 3-phenylpropyl acrylate; 3-phenoxypropyl acrylate; 4-phenylbutyl acrylate; 4-phenoxybutyl acrylate; 4-methylphenyl acrylate; 4-methylbenzyl acrylate; 2-2-methylphenylethyl acrylate; 2-3-methylphenylethyl acrylate; 2-4-methylphenylethyl acrylate; and their corresponding methacrylate compounds. Most preferred are 2-phenylethyl acrylate; 2-phenoxyethyl acrylate; 3-phenylpropyl acrylate; 3-phenoxypropyl acrylate; 4-phenylbutyl acrylate; 4-phenoxybutyl acrylate; and their corresponding methacrylate compounds. The ophthalmic device materials of the present invention preferably contain at least one monomer of formula I that is a methacrylate monomer ($X=CH_3$) and at least one monomer of formula I that is an acrylate monomer ($X=H$), wherein the total amount of the acrylate monomer(s) of formula I is greater than the total amount of methacrylate monomer(s) of formula I. In one preferred embodiment, the monomers of formula I consist essentially of 2-phenylethyl acrylate and 2-phenylethyl methacrylate.

The amount of aryl acrylic hydrophobic monomer will depend upon the identity of the chosen aryl acrylic hydrophobic monomer(s), the identity and amount of any additional ingredients of the composition, and the desired physical properties for the finished material. In general, the total amount of aryl acrylic hydrophobic monomer will be about 60% by weight or greater, preferably about 85–90% by weight.

Suitable compounds of formula II include glycidyl methacrylate, 1-glycidyl ethyl methacrylate, 2-glycidyl ethyl methacrylate, 1-glycidyl propyl methacrylate, 2-glycidyl propyl methacrylate, 3-glycidyl propyl methacrylate, and their corresponding acrylate compounds. Preferred compounds of formula II are those wherein n=1–2. Most preferred is glycidyl methacrylate.

The compounds of formula II can be made by methods known in the art, with some such compounds (e.g., glycidyl methacrylate and glycidyl acrylate) being commercially available. The identity and amount of the compounds of formula II to be included in the compositions of the present invention will depend upon the identity and amount of any additional ingredients of the composition, and the desired physical properties for the finished material. In any event, for use in ophthalmic devices, the total concentration of compounds of formula II should be about 30% by weight or less, and preferably about 10% by weight or less.

In addition to at least one compound of formula I and a total of about 30% by weight or less of one or more compounds of formula II, the compositions of the present invention may contain additional ingredients, such as cross-linking agents, UV chromophores, and colorants. The total amount of such additional ingredients is generally no more than about 10% by weight.

The copolymeric ophthalmic device materials of the present invention are preferably cross-linked. Any ophthalmically acceptable, terminally ethylenically unsaturated compound having more than one unsaturated group is suitable for use in the present copolymeric materials. Combinations of cross-linking monomers are also suitable. Examples of suitable cross-linking agents include: ethylene glycol dimethacrylate, diethylene glycol dimethacrylate, allyl methacrylate, 1,3-propanediol dimethacrylate, allyl methacrylate, 1,6-hexanediol dimethacrylate, 1,4-butanediol dimethacrylate, and the like. A preferred cross-linking agent is 1,4-butanediol diacrylate (BDDA). Generally, the amount of the cross-linking component will be at least about 0.1% by weight.

Many ophthalmically acceptable UV chromophores are known. A preferred reactive UV chromophore is 2-(2'-hydroxy-3'-methallyl-5'-methylphenyl)benzotriazole, commercially available as o-Methallyl Tinuvin P ("oMTP") from Polysciences, Inc., Warrington, Pa. UV-absorbing compounds are typically present in an amount from about 0.1–5% (weight).

Many ophthalmically acceptable blue-light absorbing compounds are known. Suitable reactive blue-light absorbing compounds include those described in U.S. Pat. No. 5,470,932, the entire contents of which are hereby incorporated by reference. Blue-light absorbers are typically present in an amount from about 0.01–0.5% (weight).

The copolymerization reaction of step one is preferably conducted with the aid of a polymerization initiator. Suitable polymerization initiators include temperature- and radiation-sensitive activators. The initiator for the copolymerization reaction of step one should be chosen such that it is activated under conditions that do not result in opening the oxirane groups and causing secondary reactions such as cross-linking. Thermal initiators include peroxy free-radical initiators, such as t-butyl (peroxy-2-ethyl)hexanoate and di-(tert-butylcyclohexyl) peroxydicarbonate (commercially available as Perkadox® 16 from Akzo Chemicals Inc., Chicago, Ill.). A preferred blue-light initiator is 2,4,6-trimethyl-benzoyldiphenylophosphine oxide, commercially available as Lucirin® TPO from BASF Corporation (Charlotte, N.C.). For example, initiators capable of being activated by 366 nm light at 1 $mW/cm^2$ or by 450 nm light at 1–14 $mW/cm^2$ are suitable. UV-initiators are generally not suitable if the compositions contain a UV-absorber. Likewise, blue-light initiators are generally not suitable if the compositions contain blue-light absorbing colorants. Initiators are typically present in relatively small amounts (e.g., 1–3% by weight).

In the first step of the method of the present invention, the compound(s) of formula I, the compound(s) of formula II, and any additional ingredients are copolymerized to form a copolymer containing pendant oxirane groups. In the second step of the method of the present invention, the copolymer containing pendant oxirane groups formed in step one is reacted with one or more compounds of the formula

  (III)

wherein

W is H, $CH_3(CH_2)_a$, or $Z(OCH_2CH_2)_b$;

b is 1–5;

Z is H, $CH_3$, or $CH_3(CH_2)_a$;

a is 0–3;and

T is O, N, S; provided that if T≠O, then W≠H.

Preferred compounds of formula III are those wherein T=O and a=0–2. Most preferred are methanol; ethanol; water; ethylene glycol; diethylene glycol.

The reaction of the copolymer containing pendant oxirane groups (the product of step one) with a compound of formula III (step two) is preferably carried out under mild conditions (e.g., 20–30° C.), and more preferably room temperature conditions, in the presence of a catalyst ("step two reaction catalyst"). Suitable step two reaction catalysts include mineral acids (e.g., dilute sulfuric acid), organic acids (e.g., paratoluene sulfonic acid), Lewis acids (e.g., $BF_3{:}OEt_2$), organic bases (e.g., triethanolamine), and inorganic bases (e.g., dilute KOH or NaOH). The most preferred catalyst is $BF_3{:}OEt_2$.

The reaction of step two is also preferably carried out in the presence of a swelling solvent in all cases where the compound of formula III does not itself sufficiently swell the copolymer containing pendant oxirane groups to allow the desired reaction of step two to proceed efficiently. The use of a swelling solvent also minimizes secondary reactions (e.g., cross-linking). Suitable inert swelling solvents include anhydrous ketones, such as acetone, methylethyl ketone, and 2-pentanone. The preferred inert swelling solvent is acetone. Reactive swelling solvents include the anhydrous $C_1$–$C_4$ alcohols. The step two reaction catalyst must be soluble in the chosen swelling solvent.

In a most preferred embodiment, there is a pre-swelling step between steps one and two described above. The pre-swelling step comprises soaking the copolymer containing pendant oxirane groups (the product of step one) in a swelling solvent in the absence of any step two reaction catalyst. Depending on the chosen swelling solvent and the size and shape of the product of step one, the soaking time for the pre-swelling step will generally range from about 0.5 to about 24 hours. In those cases where a reactive swelling solvent is chosen as the pre-swelling solvent, the reaction of step two may be carried out in the same container as the pre-swelling step by simply adding the step two reaction catalyst to the container. Alternatively, the swollen copolymer containing pendant oxirane groups may be removed from the pre-swelling step container and added to a new or fresh swelling solvent (or combination of swelling solvents) containing a step two reaction catalyst.

Preferably, the identity and proportion of ingredients of the ophthalmic device materials of the present invention are selected so that the materials possess the following properties, which make them particularly suitable for use in foldable IOLs.

The material preferably has a refractive index of at least about 1.50 as measured by an Abbe' refractometer at 589 nm (filtered halogen light source). Optics made from materials having a refractive index lower than 1.50 are necessarily thicker than optics of the same power which are made from materials having a higher refractive index. As such, IOL optics made from materials having a refractive index lower than about 1.50 generally require relatively larger incisions for IOL implantation.

The glass-transition temperature ("Tg") of the lens material, which affects the material's folding and unfolding characteristics, is preferably between about −20 to +25 ° C., and more preferably between about −5 and +16° C. Tg is measured by differential scanning calorimetry at 10° C./min., and is determined at the midpoint of the transition of the heat flux curve.

The material should have an elongation of at least 150%, preferably at least 200%, and most preferably between 300 and 600%. This property indicates that the lens generally will not crack, tear or split when folded. 30 Elongation of polymer samples is determined on dumbbell shaped tension test specimens with a 20 mm total length, length in the grip area of 4.88 mm, overall width of 2.49 mm, 0.833 mm width of the narrow section, a fillet radius of 8.83 mm, and a thickness of 0.9 mm. Testing is performed on samples at standard laboratory conditions of 23±2° C. and 50±5% relative humidity using an Instron Material Tester model 1122 with a 2000 gram load cell. The grip distance is set at 14 mm and a crosshead speed is set at 20 mm/minute and the sample is pulled to 700% elongation or until failure. The elongation (strain) is reported as a fraction of the displacement at failure to the original grip distance.

IOLs constructed of the materials of the present invention can be of any design capable of being rolled or folded into a small cross section that can fit through a relatively smaller incision. For example, the IOLs can be of what is known as a one piece or multipiece design, and comprise optic and haptic components. The optic is that portion which serves as the lens and the haptics are attached to the optic and are like arms which hold the optic in its proper place in the eye. The optic and haptic(s) can be of the same or different material. A multipiece lens is so called because the optic and the haptic(s) are made separately and then the haptics are attached to the optic. In a single piece lens, the optic and the haptics are formed out of one piece of material. Depending on the material, the haptics are then cut or lathed out of the material to produce the IOL.

In addition to IOLs, the materials of the present invention are also suitable for use as other ophthalmic devices, such as contact lenses, keratoprostheses, and corneal inlays or rings.

The invention will be further illustrated by the following examples which are intended to be illustrative, but not limiting.

EXAMPLE 1

Step 1. A formulation containing 84.6 g of 2-phenylethyl acrylate; 9.6 g of glycidyl methacrylate; 3.0 g of 1,4-butanediol diacrylate; 1.8 g o-Methallyl Tinuvin P and 1.0 g Lucirin TPO was mixed, placed into polypropylene molds and cured for thirty minutes using a Palatray™ CU blue light source at a flux of 12–14 mW/cm². The water content of the cured articles was then determined gravimetrically: the sample is soaked in deionized water overnight, removed from the water and weighed, then dried for 2 hours in an air-circulating oven at 100° C. and weighed again. The water content of the cured articles was less than 0.3%.

Step 2. The cured articles were placed into room temperature anhydrous methanol for three hours then transferred to an anhydrous methanol solution containing 2% by weight of $BF_3{:}OEt_2$ for three days at room temperature. The articles were then removed from the methanol solution and extracted in warm (40–50° C.) acetone for 2–4 hours, air dried at room temperature for 6 hours, and placed in a vacuum oven (<5 mm Hg/50° C.) for 4 hours to remove any residual volatiles. The water content of the cured articles was then evaluated again and found to be 0.9%.

EXAMPLE 2

Step 2. The cured articles formed in Step 1 of Example 1 were soaked in acetone for 3 hours, then placed in a room temperature solution containing 1.4 g $BF_3{:}OEt_2$, 25.3 g acetone, and 30.2 g of distilled water for six days. The articles were then removed from the room temperature solution and extracted in warm (40–50° C.) acetone for 2–4 hours, air dried at room temperature for 6 hours, and placed in a vacuum oven (<5 mm Hg/50° C.) for 4 hours to remove any residual volatiles. The water content of the cured articles was then evaluated again and found to be approximately 1%.

EXAMPLE 3

Step 2. The cured articles formed in Step 1 of Example 1 are soaked for 3 hours in anhydrous acetone then placed in a room temperature solution containing 1.4 g $BF_3{:}OEt_2$, 25.3 g anhydrous acetone, and 30.2 g of anhydrous ethanol for six days. The articles are then removed from the room temperature solution and extracted in warm (40–50° C.) acetone for 2–4 hours, air dried at room temperature for 6 hours, and placed in a vacuum oven (<5 mm Hg/50° C.) for 4 hours to remove any residual volatiles.

EXAMPLE 4

Step 2. The cured articles formed in Step 1 of Example 1 are soaked for 3 hours in anhydrous acetone (or a combination of anhydrous acetone and anhydrous ethylene glycol), then placed in a room temperature solution containing 1.4 g $BF_3:OEt_2$, 25.3 g anhydrous acetone, and 30.2 g of anhydrous ethylene glycol for six days. The articles are then removed from the room temperature solution and extracted in warm (40–50° C.) acetone for 2–4 hours, air dried at room temperature for 6 hours, and placed in a vacuum oven (<5 mm Hg/50° C.) for 4 hours to remove any residual volatiles.

EXAMPLE 5

Step 2. The cured articles formed in Step 1 of Example 1 are soaked for 3 hours in anhydrous acetone (or a combination of anhydrous acetone and anhydrous diethylene glycol), then placed in a room temperature solution containing 1.4 g $BF_3:OEt_2$, 25.3 g anhydrous acetone, and 30.2 g of anhydrous diethylene glycol for six days. The articles are then removed from the room temperature solution and extracted in warm (40–50° C.) acetone for 2–4 hours, air dried at room temperature for 6 hours, and placed in a vacuum oven (<5 mm Hg/50° C.) for 4 hours to remove any residual volatiles.

EXAMPLE 6

Step 2. The cured articles formed in Step 1 of Example 1 are soaked for 3 hours in anhydrous acetone (or a combination of anhydrous acetone and anhydrous monomethoxy diethylene glycol), then placed in a room temperature solution containing 1.4 g $BF_3:OEt_2$, 25.3 g anhydrous acetone, and 30.2 g of anhydrous monomethoxy diethylene glycol for six days. The articles are then removed from the room temperature solution and extracted in warm (40–50° C.) acetone for 2–4 hours, air dried at room temperature for 6 hours, and placed in a vacuum oven (<5 mm Hg/50° C.) for 4 hours to remove any residual volatiles.

EXAMPLE 7

Step 1. A formulation containing 60.6 g of 2-phenylethyl acrylate; 24.0 g of 2-phenylethyl methacrylate; 9.6 g of glycidyl methacrylate; 3.0 g of 1,4-butanediol diacrylate; 1.8 g o-Methallyl Tinuvin P and 1.0 g Lucirin TPO is mixed, placed into polypropylene molds and cured for thirty minutes using a Palatray™ CU blue light source at a flux of 12–14 $mW/cm^2$.

Step 2. The cured articles obtained in Step 1 are soaked for 3 hours in anhydrous acetone, then placed in a room temperature solution containing 1.5 g $BF_3:OEt_2$, 25 g anhydrous acetone (or anhydrous methylethyl ketone or anhydrous 2-pentanone), and 30 g of anhydrous methanol (or distilled water, anhydrous ethanol, anhydrous ethylene glycol, anhydrous diethylene glycol or anhydrous monomethoxy diethylene glycol) for six days. The articles are then removed from the room temperature solution and extracted in warm (40–50° C.) acetone for 2–4 hours, air dried at room temperature for 6 hours, and placed in a vacuum oven (<5 mm Hg/50° C.) for 4 hours to remove any residual volatiles.

The invention has been described by reference to certain preferred embodiments; however, it should be understood that it may be embodied in other specific forms or variations thereof without departing from its spirit or essential characteristics. The embodiments described above are therefore considered to be illustrative in all respects and not restrictive, the scope of the invention being indicated by the appended claims rather than by the foregoing description.

I claim:

1. A method of preparing an ophthalmic device material comprising the steps of a) forming a copolymer having pendant oxirane groups by free radical copolymerization of a composition comprising (i) one or more aryl acrylic hydrophobic monomers of the formula

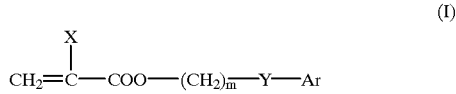

(I)

wherein:

X is H or $CH_3$;

m is 2–4;

Y is nothing, O, S, or NR wherein R is H, $CH_3$, $C_nH_{2n+1}$", wherein n=1–10,", and iso-$OC_3H_7$, $C_6H_5$, or $CH_2C_6H_5$; and Ar is $C_6H_5$ which can be unsubstituted or substituted with H, $CH_3$, $C_2H_5$, n-$C_3H_7$, iso-$C_3H_7$, $OCH_3$, $C_6H_{11}$, Cl, Br, $C_6H_5$, or $CH_2C_6H_5$;

and (ii) a total of about 30% by weight or less of one or more compounds of the formula

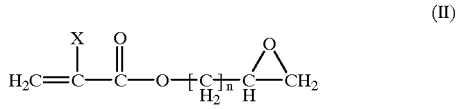

(II)

wherein

X is H or $CH_3$; and n is 1–4; and (b) reacting the copolymer containing pendant oxirane groups formed in step (a) with one or more compounds of the formula

W—T—H  (III)

wherein

W is H, $CH_3(CH_2)_a$, or $Z(OCH_2CH_2)_b$;

a is 0–3;

b is 1–5;

Z is H or $CH_3(CH_2)_p$;

p is 0–3; and

T is O, NH, or S; provided that if T≠O, then W≠H.

2. The method of claim 1 wherein m is 2–4, Y is nothing or O, and Ar is phenyl in formula I.

3. The method of claim 1 wherein the one or more aryl acrylic hydrophobic compounds of formula I are selected from the group consisting of 2-phenoxyethyl acrylate; phenyl acrylate; benzyl acrylate; 2-phenylethyl acrylate; 3-phenylpropyl acrylate; 3-phenoxypropyl acrylate; 4-phenylbutyl acrylate; 4-phenoxybutyl acrylate; 4-methylphenyl acrylate; 4-methylbenzyl acrylate; 2,2-methylphenylethyl acrylate; 2,3-methylphenylethyl acrylate; 2,4-methylphenylethyl acrylate; 2-phenoxyethyl methacrylate; phenyl methacrylate; benzyl methacrylate; 2-phenylethyl methacrylate; 3-phenylpropyl methacrylate; 3-phenoxypropyl methacrylate; 4-phenylbutyl methacrylate; 4-phenoxybutyl methacrylate; 4-methylphenyl methacrylate; 4-methylbenzyl methacrylate; 2,2-methylphenylethyl methacrylate; 2,3-methylphenylethyl methacrylate; and 2,4-methylphenylethyl methacrylate.

4. The method of claim 1 wherein the total amount of the one or more aryl acrylic hydrophobic compounds of formula I is about 60% by weight or greater.

5. The method of claim 1 wherein the total amount of one or more compounds of formula II is about 10% by weight or less.

6. The method of claim 1 wherein T is O and a is 0–2.

7. The method of claim 6 wherein the one or more compounds of formula III is selected from the group consisting of methanol; ethanol; water; ethylene glycol; and diethylene glycol.

8. The method of claim 1 wherein the reaction of step (b) is carried out in the presence of a catalyst selected from the group consisting of sulfuric acid; paratoluene sulfonic acid; and $BF_3:OEt_2$.

9. The method of claim 1 wherein the reaction of step (b) is carried out in the presence of a swelling solvent.

10. The method of claim 9 wherein the swelling solvent is selected from the group consisting of anhydrous ketones and anhydrous $C_1-C_4$ alcohols.

11. The method of claim 1 wherein the copolymer containing pendant oxirane groups formed in step (a) is swollen in a swelling solvent prior to step (b).

12. The method of claim 1 wherein the ophthalmic device material has a refractive index of at least about 1.50; a $T_g$ from about –20 to +25° C.; and an elongation of at least 150%.

13. The method of claim 1 wherein the ophthalmic device is selected from the group consisting of intraocular lenses; contact lenses; keratoprostheses; corneal inlays; and corneal rings.

14. An ophthalmic device material made by the method of claim 1.

15. The method of claim 1 wherein T is O or S.

* * * * *